US012592375B2

(12) United States Patent (10) Patent No.: US 12,592,375 B2
Cho et al. (45) Date of Patent: Mar. 31, 2026

(54) LITHIUM-SULFUR BATTERY CATHODE USING FABRIC MATERIAL, LITHIUM-SULFUR BATTERY COMPRISING SAME, AND MANUFACTURING METHOD THEREFOR

(71) Applicant: KOREA UNIVERSITY RESEARCH AND BUSINESS FOUNDATION, Seoul (KR)

(72) Inventors: Jinhan Cho, Seoul (KR); Dong Yeeb Shin, Uiwang-si (KR); Yongkwon Song, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 544 days.

(21) Appl. No.: 18/030,656

(22) PCT Filed: Aug. 4, 2021

(86) PCT No.: PCT/KR2021/010203
§ 371 (c)(1),
(2) Date: Apr. 6, 2023

(87) PCT Pub. No.: WO2022/075565
PCT Pub. Date: Apr. 14, 2022

(65) Prior Publication Data
US 2024/0021779 A1 Jan. 18, 2024

(30) Foreign Application Priority Data
Oct. 8, 2020 (KR) ........................ 10-2020-0130553

(51) Int. Cl.
H01M 4/04 (2006.01)
H01M 4/60 (2006.01)
(Continued)

(52) U.S. Cl.
CPC ......... H01M 4/045 (2013.01); H01M 4/0471 (2013.01); H01M 4/602 (2013.01);
(Continued)

(58) Field of Classification Search
None
See application file for complete search history.

(56) References Cited

U.S. PATENT DOCUMENTS 10,886,530 B2 * 1/2021 Cho ..................... H01M 10/052
11,309,535 B2 * 4/2022 Zheng .................. H01M 4/625
(Continued)

FOREIGN PATENT DOCUMENTS

CN 111244433 B * 5/2021 ........... H01M 4/628
KR 10-2018-0017796 A 2/2018
(Continued)

OTHER PUBLICATIONS

Chung et al. "A carbon-cotton cathode with ultrahigh-loading capability for statically and dynamically stable lithium-sulfur batteries." *ACS nano* vol. 10 No. 11. 2016 (pp. 1-33).
(Continued)

*Primary Examiner* — Tracy M Dove
(74) *Attorney, Agent, or Firm* — NSIP Law

(57) ABSTRACT
Provided is a method for manufacturing a lithium-sulfur battery cathode by using a fabric material, comprising the steps of: carbonizing a fabric material through heat treatment to manufacture a conductive support; electroplating a conductive metal material on the conductive support; loading, on the electroplated conductive support, a slurry comprising a sulfur polymer and a first carbon material replaced with a first functional group capable of hydrogen bonding to the sulfur polymer; and forming a capping layer by loading, on the conductive support, a second carbon material
(Continued)

replaced with a second functional group capable of layer-by-layer self-assembling with the first carbon material.

10 Claims, 22 Drawing Sheets

(51) Int. Cl.
     *H01M 4/66*      (2006.01)
     *H01M 4/72*      (2006.01)
(52) U.S. Cl.
     CPC ........... *H01M 4/661* (2013.01); *H01M 4/663*
            (2013.01); *H01M 4/667* (2013.01); *H01M*
                                          *4/72* (2013.01)

(56)                References Cited

U.S. PATENT DOCUMENTS

2019/0190004  A1 *   6/2019   Zheng ................... H01M 4/747
2022/0115662  A1 *   4/2022   Kim ....................... H01M 4/38

FOREIGN PATENT DOCUMENTS

KR      10-2019-0118733  A       10/2019
KR            102051213  B1 *  12/2019   ............ H01M 4/362
KR          20200049685  A   *   5/2020   ............ H01M 4/362
KR      10-2020-0095606  A        8/2020
KR            102173599  B1 *  11/2020   ......... C01B 21/0605

OTHER PUBLICATIONS

Zhang et al. "Metal-embedded porous carbon fibers fabricated from bamboo sticks as a novel cathode for lithium-sulfer batteries." *ACS appiled materials & interface*. vol. 10 No. 16. 2018 (pp. 1-30).

* cited by examiner

FIG.3A

| Carbonization temperature (°C) | 600 | 700 | 900 |
|---|---|---|---|
| Sheet resistance ($\Omega$ sq$^{-1}$) | $3.5 \times 10^{-7}$ | 361.2 | 58.3 |

FIG.9
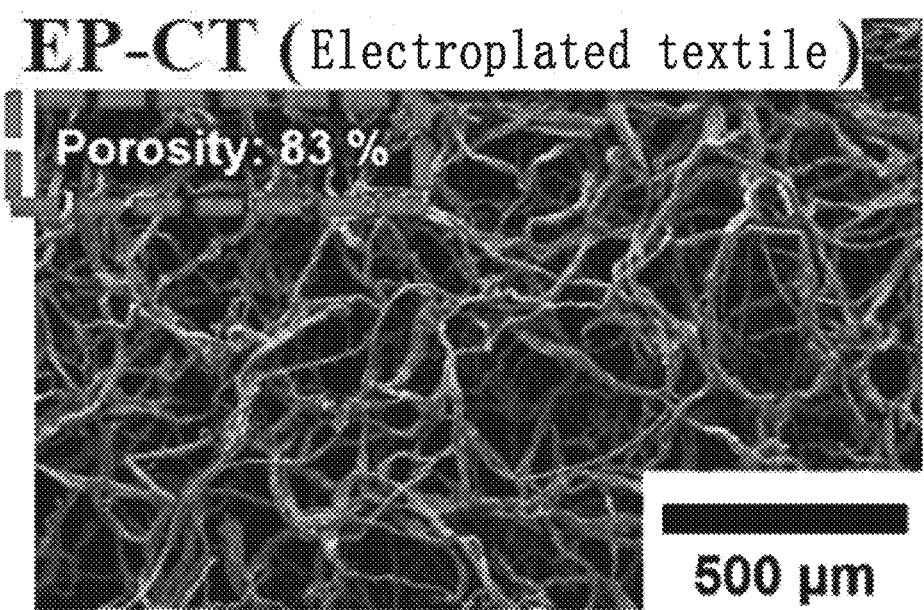
 Density : 0.26 g cm$^{-3}$
 Surface area : ~ 0.158 m$^2$ g$^{-1}$ Commercially available porous metal Density: $0.71 \text{ g cm}^{-3}$ Surface area: $\sim 0.035 \text{ m}^2 \text{ g}^{-1}$

| S-poly.:3 mg cm⁻² | 0.1C | | 0.2C | 0.5C | 1C | 0.1C |
| | 1 st | 5 th | | | | |
|---|---|---|---|---|---|---|
| EP-CT/HS/CL | 4.4 mAh·cm⁻² 1618 mAh·g⁻¹ | 3.6 mAh·cm⁻² 1299 mAh·g⁻¹ | 3.4 mAh·cm⁻² 1254 mAh·g⁻¹ | 3.2 mAh·cm⁻² 1189 mAh·g⁻¹ | 2.8 mAh·cm⁻² 1028 mAh·g⁻¹ | 3.5 mAh·cm⁻² 1287 mAh·g⁻¹ |
| EP-CT/HS | 4.3 mAh·cm⁻² 1548 mAh·g⁻¹ | 3.2 mAh·cm⁻² 1151 mAh·g⁻¹ | 3 mAh·cm⁻² 1078 mAh·g⁻¹ | 2.8 mAh·cm⁻² 1007 mAh·g⁻¹ | 2.5 mAh·cm⁻² 889mAh·g⁻¹ | 3.2 mAh·cm⁻² 1151 mAh·g⁻¹ |
| C-CT/HS | 2.5 mAh·cm⁻² 808 mAh·g⁻¹ | 1.6 mAh·cm⁻² 588 mAh·g⁻¹ | 1.4 mAh·cm⁻² 516 mAh·g⁻¹ | 1.3 mAh·cm⁻² 468 mAh·g⁻¹ | 1.2 mAh·cm⁻² 422 mAh·g⁻¹ | 1.5 mAh·cm⁻² 554 mAh·g⁻¹ |

FIG.17

LITHIUM-SULFUR BATTERY CATHODE USING FABRIC MATERIAL, LITHIUM-SULFUR BATTERY COMPRISING SAME, AND MANUFACTURING METHOD THEREFOR

CROSS REFERENCE TO RELATED APPLICATIONS

This application is a U.S. National Stage Application of International Application No. PCT/KR2021/010203, filed on Aug. 4, 2021, which claims the benefit under 35 USC 119(a) and 365(b) of Korean Patent Application No. 10-2020-0130553, filed on Oct. 8, 2020 in the Korean Intellectual Property Office, the entire disclosure of which is incorporated herein by reference for all purposes.

TECHNICAL FIELD

The present invention relates to a cathode for a lithium-sulfur battery using a textile material, a lithium-sulfur battery including the same, and a method of manufacturing the same, and more specifically, to a cathode for a lithium-sulfur battery using a textile material, which has a large amount of loaded sulfur and excellent electrical properties, a lithium-sulfur battery including the same, and a method of manufacturing the same.

BACKGROUND ART

Electrodes, catalysts, adsorbents, sensors, and the like all have a structure containing a conductive material, such as a metal, as an active material on a support. In this case, excellent electrical conductivity of the support, a large specific surface area of the support and the conductive active material, favorable processability, and the like are required.

For this reason, electrodes directly using a carbon support such as carbon nanotubes, graphene, or the like as a support and a method of manufacturing the same have been utilized.

For example, Korean Unexamined Patent Publication No. 10-2009-0041637 discloses a polyimide carbon nanofiber electrode capable of decreasing the diameter of a carbon fiber, and Korean Unexamined Patent Publication No. 10-2017-0080159 discloses a carbon fiber textile/metal oxide-based nanowire-based electrode for an energy storage system and a method of manufacturing the same.

However, the direct use of a carbon support has a problem in that the manufacture of a carbon-based support is required, and accordingly, the separate manufacture of a carbon-based material is required.

In order to solve the above problem, studies have been actively conducted on the use of a textile material as a support. For example, when used in an electrode, the textile material becomes a structure which is capable of increasing the amount of a loaded active material and effective for smooth ion migration due to having high porosity and a large internal surface area. Therefore, studies have been reported on the manufacture of a porous electrode by imparting conductivity to an insulating textile material and application of the porous electrode as a high-performance energy storage element.

As energy storage elements, lithium-sulfur batteries are actively being studied as next-generation energy storage elements due to having a theoretically high energy density value. However, the lithium-sulfur battery has a disadvantage in that operating stability is low due to low electrical conductivity of sulfur which is a cathode material, volumetric expansion during operation, and a sulfur loss (shuttle effect) caused by an irreversible reaction.

In order to overcome the above disadvantage, studies are being actively conducted on the manufacture of an electrode by mixing sulfur with a material having physical/chemical bonding strength to sulfur and conductivity, but these studies are conducted on a flat plate and have a limitation in the amount of loaded sulfur.

In order to overcome the electrical conductivity and ion conductivity limitations caused by an increase in the amount of active material loaded in a current collector and implement high-density energy capacity per unit volume/area and output characteristics, it is essential to achieve the development of a porous electrode having excellent electrical conductivity and a large surface area.

In manufacture of a porous current collector, a textile material is a structure which is capable of increasing the amount of a loaded active material and effective for smooth ion migration due to having high porosity and a large internal surface area, but it has an insulating property. Therefore, studies have been reported on the manufacture of a porous electrode by imparting conductivity to an insulating textile material and application of the porous electrode as a high-performance energy storage element.

However, these various cases have difficulty in effectively manufacturing a porous current collector for a high-performance energy storage element due to the following reasons. First, a commercially available porous metal current collector is too heavy to manufacture a lightweight element and has a limitation in porosity and an internal surface area despite having high electrical conductivity. Also, there is a limitation in manufacturing a large amount of electrodes due to an etching process using strong acid and a high price, and a carbon-based porous electrode, in which a textile material is coated with a conductive carbon material such as CNTs or graphene, has a disadvantage such as low conductivity and degraded electrochemical stability compared to those when a metal material is used.

Meanwhile, when a textile material is coated by an electroless plating (electroless deposition) method, it is difficult to uniformly coat a fibril structure inside the textile material and also effectively utilize the surface area of a porous structure due to an agglomeration phenomenon. In addition, since impurities are included during surface treatment and reduction processes, there is a limitation in the electrical conductivity and mechanical stability of a final electrode.

Furthermore, when metal nanoparticles are additionally applied, it is difficult to impart electrical conductivity due to the lack of knowledge about interfacial treatment between particles and interfacial resistance between particles, and an additional surface treatment process for overcoming this difficulty has a disadvantage in that the total process time required for manufacturing an electrode is prolonged.

DISCLOSURE

Technical Problem

The present invention is directed to providing a method of manufacturing a cathode for a lithium-sulfur battery, which is able to improve utilization efficiency and low electrical conductivity, which are chronic problems of a cathode for a lithium-sulfur battery, by manufacturing, from a textile material, a porous current collector capable of maintaining excellent network characteristics of the textile material while having excellent conductivity, mechanical safety, and a large specific surface area to increase the amount of loaded sulfur and coating an electrode with a conductive capping layer (protective layer).

Technical Solution

One aspect of the present invention provides a method of manufacturing a cathode for a lithium-sulfur battery using a textile material, which includes: carbonizing a textile material through thermal treatment to prepare a conductive support; subjecting the conductive support to electroplating with a conductive metal material; loading, in the coated conductive support, a slurry including a sulfur polymer and a first carbon material modified with a first functional group capable of hydrogen bonding with the sulfur polymer; and loading, in the resulting conductive support, a second carbon material modified with a second functional group capable of layer-by-layer self-assembly with the first carbon material to form a capping layer.

In an embodiment of the present invention, the carbon material may be a carbon nanotube, the first functional group may be an amine group, and the second functional group may be a carboxyl group.

In an embodiment of the present invention, the thermal treatment may be performed at 600° C. to 2000° C., and the carbon support prepared by the thermal treatment may maintain a network structure of the textile material as it is.

In an embodiment of the present invention, the conductive material may include at least one selected from the group consisting of Ni, Cu, and Al.

In an embodiment of the present invention, the textile material may be a textile containing carbon atoms in a main chain.

Another aspect of the present invention provides a cathode for a lithium-sulfur battery, which includes: a carbon support having a network structure of a textile material; a conductive metal material applied on the carbon support; a sulfur polymer loaded in the conductive metal material; a first carbon material modified with a first functional group which is bonded to the sulfur polymer; and a second carbon material which is bonded to the first carbon material to form a capping layer.

In an embodiment of the present invention, the cathode for a lithium-sulfur battery may be manufactured by the above-described method.

In an embodiment of the present invention, the carbon material may be a carbon nanotube, the first functional group may be an amine group, and the second functional group may be a carboxyl group.

In an embodiment of the present invention, the conductive material may include at least one selected from the group consisting of Ni, Cu, and Al.

Still another aspect of the present invention provides a lithium-sulfur battery including the above-described cathode for a lithium-sulfur battery.

Advantageous Effects

According to the present invention, a porous conductive structure whose electrical/mechanical strength and processability are excellent can be manufactured by thermally treating a textile material at a low temperature of 600° C. to prepare a carbon support, which exhibits excellent conductivity and high porosity and has a network structure, and then coating the carbon support with a metal active material by a simple electroplating method. Particularly, an electrode manufactured according to the present invention can implement high energy density per unit area and a high charge/discharge rate as the amount of loaded sulfur is increased due to the large surface area and excellent electron transfer characteristics of a porous metal current collector, and can improve the energy density and operating stability of a lithium-sulfur battery.

In addition, multi-walled carbon nanotubes (MWCNTs) are surface-modified to manufacture MWCNTs with an amine group ($NH_2$), the resulting MWCNTs are mixed with a sulfur polymer (S-poly) without an insulating polymer binder to prepare a mixed slurry (HS), and the slurry is loaded in a current collector. The $NH_2$-MWCNT improves the conductivity of a S-poly layer, the —$NH_2$ group improves the utilization efficiency of S-poly due to having bonding strength to lithium polysulfide irreversibly moving during operation, and thus energy density is improved. Afterward, MWCNTs with a carboxyl group (COOH) are manufactured and applied as multiple layers onto the surface of the mixed slurry loaded in the electrode by a layer-by-layer self-assembly method based on hydrogen bonding strength to the $NH_2$-MWCNT to form a conductive capping layer (CL), and as a result, the shuttle effect of S-poly during operation is prevented to improve operating stability.

Additionally, since the present invention increases the amount of a loaded active material due to the high porosity and large surface area of a support maintaining a network structure of a textile material as it is and also ensures smooth ion migration, the conductive structure according to the present invention can be applied to not only energy storage elements but also various electrical elements (e.g., sensors) or catalysts, which require a lightweight porous structure. Also, the present invention, in which a conductive structure is manufactured through simple electroplating, has an advantage in that there is no limitation on the size and shape of a structure to be manufactured.

DESCRIPTION OF DRAWINGS

FIG. 3A shows the sheet resistance value of a carbon support (C-CT) formed according to thermal treatment temperature.

FIG. 9 shows an SEM image of a porous conductive structure according to the present invention.

FIG. 11 shows SEM and elemental mapping images of EP-CT/HS manufactured by loading 3, 5, and 8 mg/cm² of a sulfur polymer (S-poly) in an electroplated porous conductive structure (EP-CT) by a slurry loading method.

FIG. 12 is a schematic diagram showing that EP-CT/HS/CL is formed by coating the EP-CT/HS of FIG. 11 with a conductive carbon capping layer by a layer-by-layer self-assembly method and a diagram showing the bonding thereof in detail.

FIG. 16 shows a capacity characteristic comparison table.

FIG. 17 shows a Nyquist plot analysis result of C-CT/HS, EP-CT/HS, and EP-CT/HS/CL cathodes (S-poly loading amount: 3 mg/cm²).

Referring to FIGS. 14 to 18, it can be seen that EP-CT, which is a porous conductive structure according to the present invention, exhibits excellent charge transfer characteristics and reaction efficiency compared to a carbon support (C-CT) according to the present invention, and when a conductive capping layer (CL) is introduced on the EP-CT structure, the performance and stability of an electrode material according to the present invention are improved.

MODES OF THE INVENTION

Figure 1:
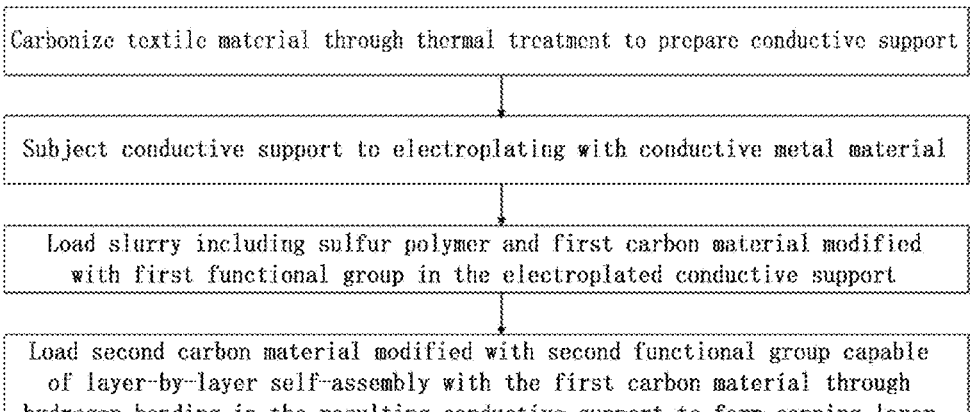
FIG. 1 is a flow chart of a method of manufacturing a textile material-based porous conductive structure (EP-CT) according to an embodiment of the present invention.

The present invention can be subjected to various modifications and can have various embodiments. Therefore, it is intended that specific embodiments are illustrated in the drawings and described in detail in the detailed description. However, it should be understood that this is not intended to limit the present invention to particular embodiments, and the present invention includes all modifications, equivalents, and alternatives which fall within the spirit and technical scope of the present invention. In describing the present invention, in a case where it is determined that a specific description for a related known technology may obscure the gist of the present invention, the detailed description therefor is omitted.

In order to solve the above-described problems, the present invention shows that a porous conductive structure having excellent processability can be manufactured through simple electroplating using a textile material which is an insulating material and applied to an electrode, a catalyst, or the like. Furthermore, when applied as an electrode, the porous conductive structure is confirmed to be applicable as an energy storage element which is a high-performance battery.

Particularly, in the present invention, thermal treatment of a textile material is performed at 600 to 900° C., and through this thermal treatment, a textile material (cellulose, silk, polyacrylonitrile, Kevlar, etc.) having a sp2-bonding hexagonal structure is carbonized and an inherent highly porous network structure of the textile material itself can be maintained, and excellent conductivity is exhibited by carbonization of the material into a sp2-bonding hexagonal structure after thermal treatment. Furthermore, when the highly porous support is coated with a metal active material in subsequent electroplating, the entire surface of the support can be uniformly coated without a problem occurring when a textile material is directly plated or a problem in that only the surface is over-plated and the inside is not coated.

FIG. 1 is a flow chart of a method of manufacturing a textile material-based porous conductive structure (EP-CT) according to an embodiment of the present invention.

Referring to FIG. 1, in a method of manufacturing a textile material-based conductive structure according to an embodiment of the present invention, first, a textile material is carbonized through thermal treatment to prepare a carbon support.

In an embodiment of the present invention, the thermal treatment temperature is important in determining the sheet resistance that allows subsequent electroplating. In the present invention, since the sheet resistance that allows electroplating is obtained at a sheet resistance (361Ω/sq) level of a textile material obtained at 700° C., the thermal treatment is preferably performed at 700° C. or more. Generally, the thermal treatment temperature is increased to 2000° C. or more to increase the conductivity of a textile material itself. However, in the present invention, since it is sufficient to ensure minimum conductivity for subsequent electroplating, the thermal treatment is performed at 700° C. or more, preferably 700° C. to less than 2000° C., more preferably 700° C. to 1500° C., and even more preferably 700° C. to 900° C.

Next, the carbon support is subjected to electroplating. In an embodiment of the present invention, the electroplating is performed by nickel plating. Particularly, by subjecting a carbon support, which maintains high porosity and has a sp2 hexagonal structure even when lowering sheet resistance to a level that allows electroplating, to electroplating to impart high electrical conductivity in a short time, a textile material-based porous conductive structure can be manufactured. The conductive structure according to the present invention has high porosity (which means a large specific surface area and active area), and the high porosity can increase the amount of loaded sulfur.

In an embodiment of the present invention, although Ni is used as the conductive material, all conductive materials capable of being electroplated, such as Cu, Al, and the like, fall within the scope of the present invention.

Next, a mixed slurry (HS) including a sulfur polymer and a first carbon material modified with a first functional group (e.g., amine group) is loaded in the porous conductive structure (EP-CT). In other words, the present invention has an advantage in that 1) an NH₂-carbon material (e.g., carbon nanotube), which improves conductivity and provides bonding strength to a capping layer (CL), is able to be loaded along with 2) a sulfur material in the porous conductive structure without a separate binder. In an embodiment of the present invention, although a carbon nanotube is used, any organic materials, graphene, and the like fall within the scope of the present invention.

Next, a second carbon material modified with a second functional group (e.g., carboxyl group) capable of layer-by-layer self-assembly with the first carbon material (carbon nanotube) through hydrogen bonding is used to form a capping layer which is a protective layer.

A cathode for a lithium-sulfur battery provided by the above method includes: a carbon support having a network structure of a textile material; a conductive material electroplated on the carbon support; a sulfur polymer loaded in the conductive material; a first carbon material modified with a first functional group, which is mixed with the sulfur polymer; and a second carbon material which is bonded to the first carbon material to form a capping layer, and has excellent conductivity and reaction efficiency by loading a large amount of sulfur without a separate binder.

Figure 2:
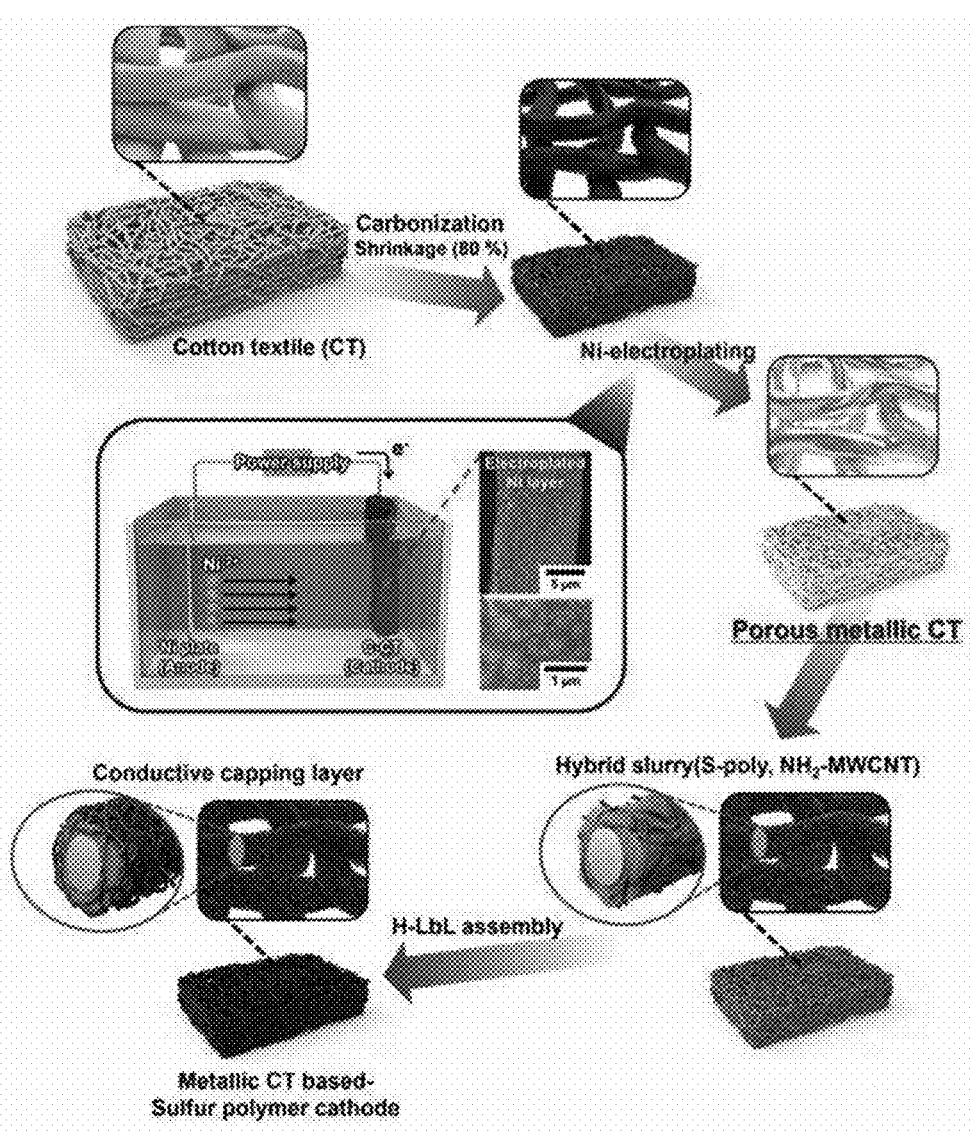
FIG. 2 is a schematic diagram showing the above-described manufacture of a porous conductive current collector according to an embodiment of the present invention and the application thereof as a cathode for a lithium-sulfur battery.

FIG. 2 is a schematic diagram showing the above-described method of manufacturing a porous conductive structure according to an embodiment of the present invention and the formation of a capping layer by a layer-by-layer self-assembly method.

Figure 12:
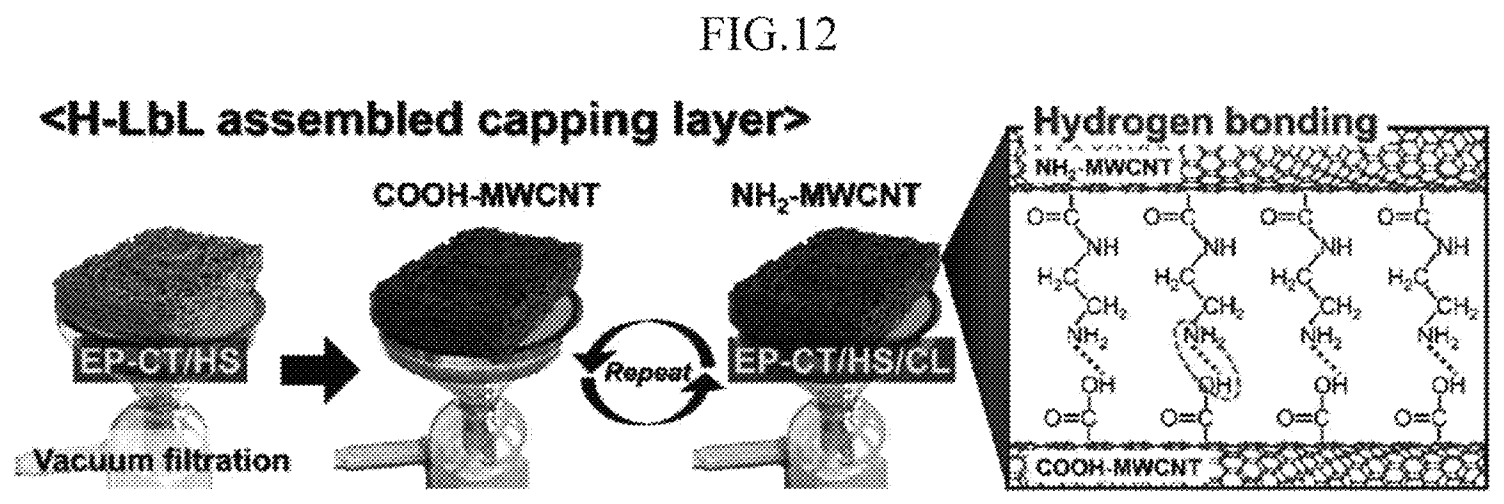

More specifically, referring to FIG. 12, carbon nanotubes may be coupled layer by layer through hydrogen bonding between a first functional group and a second functional group, and this suggests that, in the case of the electrode according to the present invention, a desired functional group can be introduced into an electrode support by the above-described method.

A manufacturing method and a measurement method are summarized as follows.

1) A textile material is thermally treated to form a carbon support provided with conductivity.

2) The carbon support is subjected to electroplating to manufacture a porous conductive structure having excellent electrical conductivity.

3) Electrical properties of the manufactured electrode are measured using a 4-point probe.

4) Sulfur is polymerized to synthesize a sulfur polymer (S-poly).

5) The surface of MWCNTs is modified with a —NH$_2$ group and mixed with the S-poly to prepare a mixed slurry.

6) The mixed slurry is loaded in the porous metal current collector by a loading method.

7) NH$_2$-MWCNT and COOH-MNWCNT are applied as multiple layers by forming hydrogen bonding strength using a layer-by-layer self-assembly method.

8) Electrochemical properties of the manufactured cathode for a lithium-sulfur battery are evaluated to analyze the energy storage characteristics of the electrode.

Hereinafter, the present invention will be described in further detail with reference to specific examples.

EXAMPLE

Manufacture of Sulfur Polymer (S-Poly)

Sulfur powder (4.50 g, 17.6 mmol) was heated to 185° C. in an oil bath, 1,3-diisopropenylbenzene (0.5 g, 3.16 mmol) was added to the green molten sulfur, then stirring was performed for 10 minutes, and cooling was performed at room temperature.

Manufacture of COOH-MWCNT and NH$_2$-MWCNT

Pure multi-walled carbon nanotubes (MWCNTs) were oxidized in a H$_2$SO$_4$/HNO$_3$ mixed solution at 70° C. for 3 hours to manufacture COOH-MWCNT. Then, the COOH-MWCNT suspension was stirred with ethylenediamine (8.0 mL) and 1-(3-dimethylaminopropyl)-3-ethylcarbodiimide methiodide (800 mg) for 6 hours to manufacture NH$_2$-MWCNT. The resulting suspension was purified (MWCO: 12,000-14,000) for 3 days to remove impurities and residues.

Manufacture of Ni-Electroplated Porous Conductive Structure (EP-CT)

An electroplated porous conductive structure (EP-CT) was manufactured by carbonizing a textile material (cotton) and then performing electroplating. First, a textile was washed and dried. Afterward, the dried textile was heated for 3 hours while increasing a temperature at a rate of 2° C./min to 700° C. Then, the heated textile was cooled at room temperature and immersed in a Watts bath, and electroplating was performed using nickel (Ni) as a negative electrode and the textile as a cathode. A current density in the electroplating was 216 mA/cm$^2$ for 20 minutes. Then, the resulting textile was washed at room temperature and then dried.

Conductive Capping of Slurry-Coated EP-CT Electrode (EP-CT/HS/CL)

For sulfur loading, 65 wt % of S-poly, 25 wt % of carbon black, and 10 wt % of the NH$_2$-MWCNT were mixed in N-methyl-2-pyrrolidone (NMP), and the resulting mixture was sonicated under a high power condition for an hour. Afterward, the manufactured porous conductive structure (EP-CT) was immersed in the sulfur slurry (HS) to load sulfur (EP-CT/HS). Particularly, the present invention has an advantage in that the amount of loaded sulfur may be controlled by the viscosity of the sulfur slurry, and this may be controlled by the amount of the solvent NMP. Then, the EP-CT/HS loaded with the sulfur slurry was sequentially coated with the manufactured COOH-MWCNT and NH$_2$-MWCNT solutions using a vacuum pump to form a capping layer (EP-CT/HS/CL).

Experimental Examples

FIG. 3A is the sheet resistance data of the carbon support according to thermal treatment temperature.

Figure 3B:
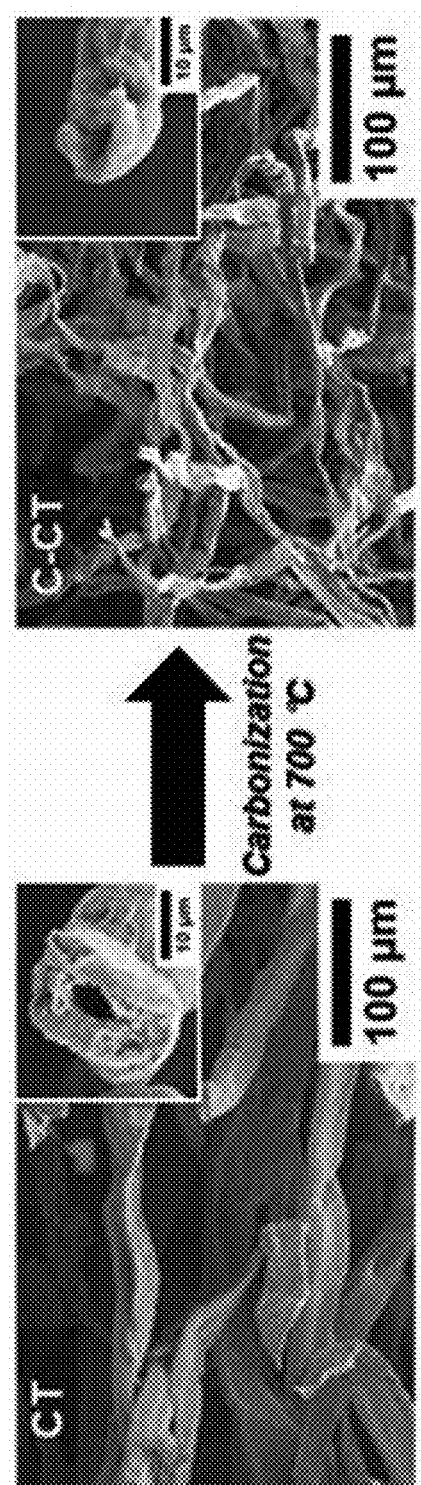
FIG. 3B shows a scanning electron microscope (SEM) image of a carbon support maintaining a porous structure after thermal treatment at 700° C.

Referring to FIGS. 3A and 3B, it can be confirmed that a sheet resistance of 361.2Ω/sq, which allows electroplating, was exhibited at 700° C. Therefore, it can be seen that, when thermal treatment is performed at a temperature of 700° C. or more, manufacture of the support of the structure according to the present invention is possible.

Figure 4A:
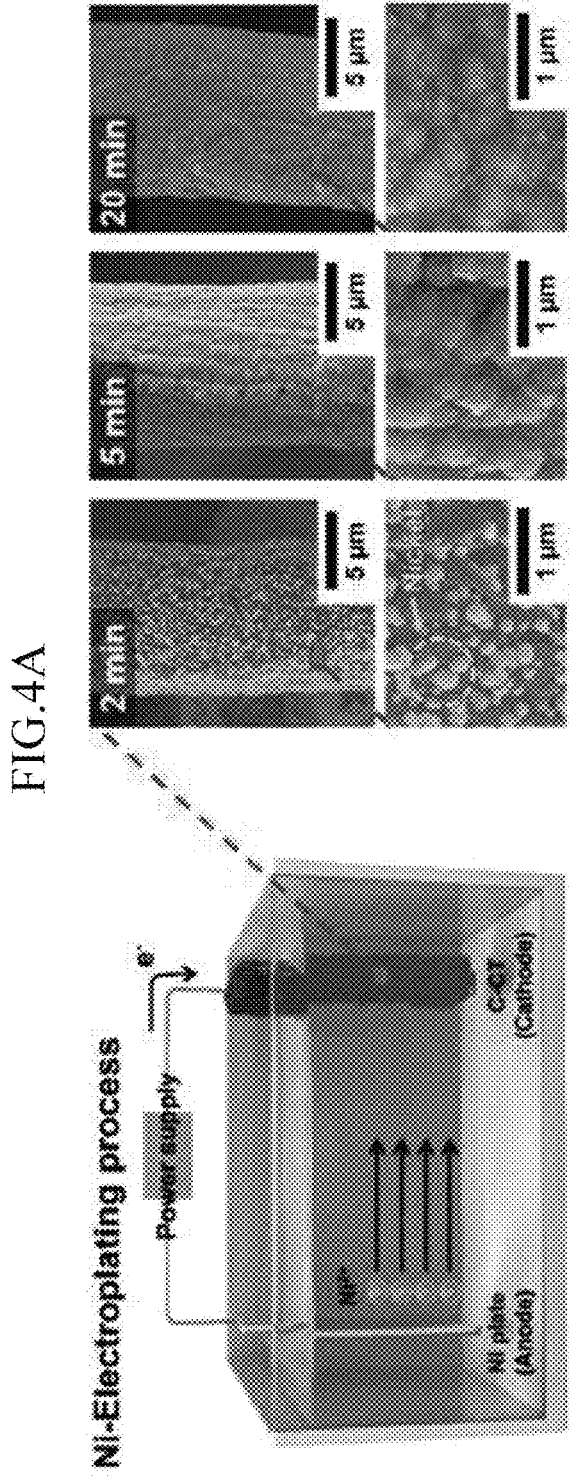
FIG. 4A shows an electroplating device used in the embodiment and an SEM image of a metal-coated support according to plating time.
Figure 4B:
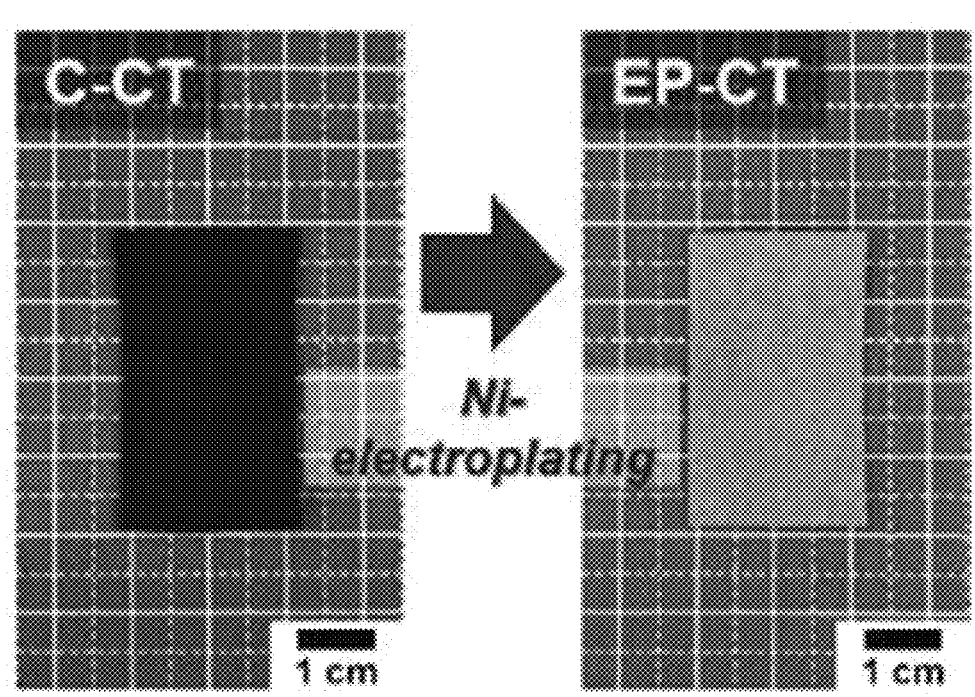
FIG. 4B shows images before and after plating.

FIGS. 4A and 4B show an electroplating device used in the example and an image of the coated support according to plating time, and images before and after plating, respectively.

Referring to FIGS. 4A and 4B, it can be confirmed that, when electroplating with nickel was performed in an electroplating device of FIG. 4A, a support was coated with nickel to form a conductive structure. Particularly, it can be confirmed a protruding structure was formed on the surface according to plating time.

Figure 5:
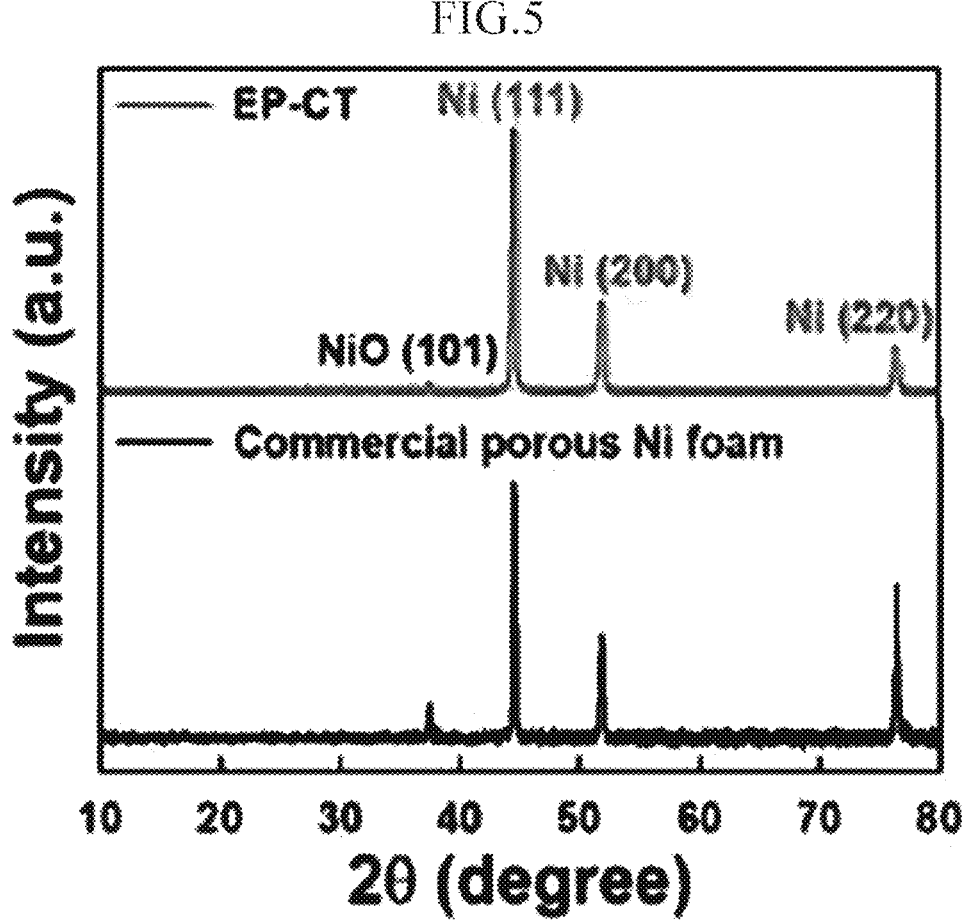
FIG. 5 shows an X-ray diffraction (XRD) result of a porous conductive structure according to an embodiment of the present invention and a commercially available porous nickel support.

FIG. 5 shows an X-ray diffraction (XRD) result of the porous conductive structure according to the example of the present invention and a commercially available porous nickel support. In this case, the commercially available porous nickel support was nickel foam (Ni foam, Goodfellow, Index number: 028-002-00-7, CAS number: 7440-02-0).

Referring to FIG. 5, it can be confirmed that, when the textile material-based support according to the present invention was coated with nickel, different types of crystallinity were exhibited. In other words, it can be seen from the result of FIG. 5 that high-quality nickel can be formed in the conductive structure (EP-CT) manufactured by carbonization and electroplating according to the present invention like the commercially available porous nickel structure.

Figure 6:
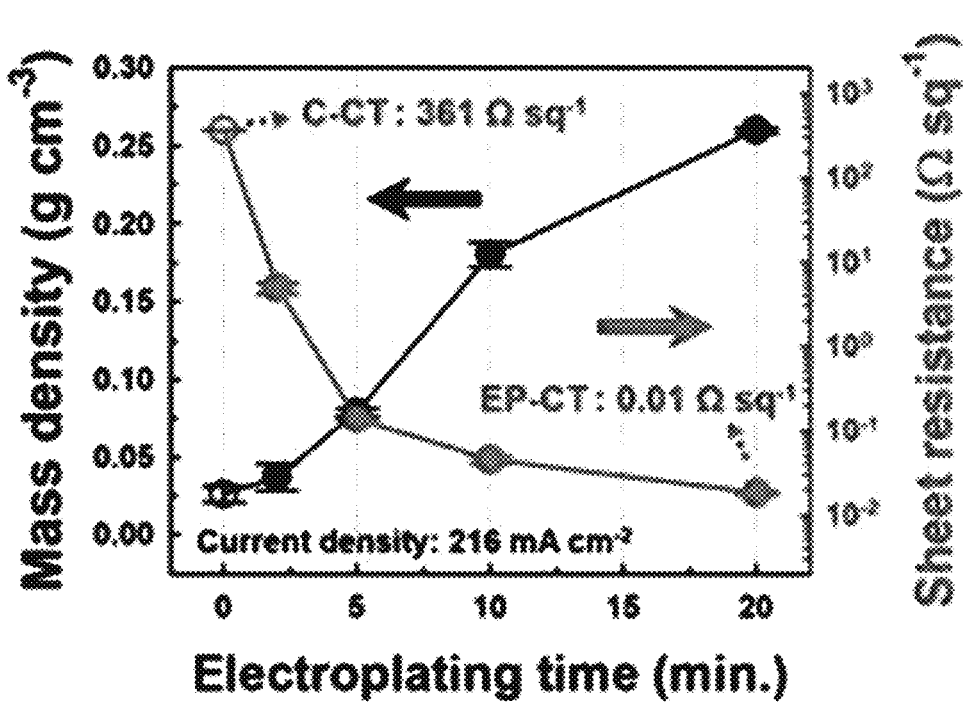
FIG. 6 shows a measurement result of a change in electrical properties according to the electroplating time of a carbon support.

FIG. 6 shows a measurement result of changes in density and electrical properties according to electroplating time of the carbon support.

Referring to FIG. 6, it can be confirmed that loading resistance was decreased according to electroplating time. Particularly, this linear resistance decrease is different from a phenomenon occurring when only the outer surface of the textile material is over-plated and the inside is not coated, that is, a phenomenon in which resistance is not rapidly decreased after the initial stage, and this result proves that plating occurs uniformly even inside the textile material without over-plating in the case of the present invention.

Figure 7:
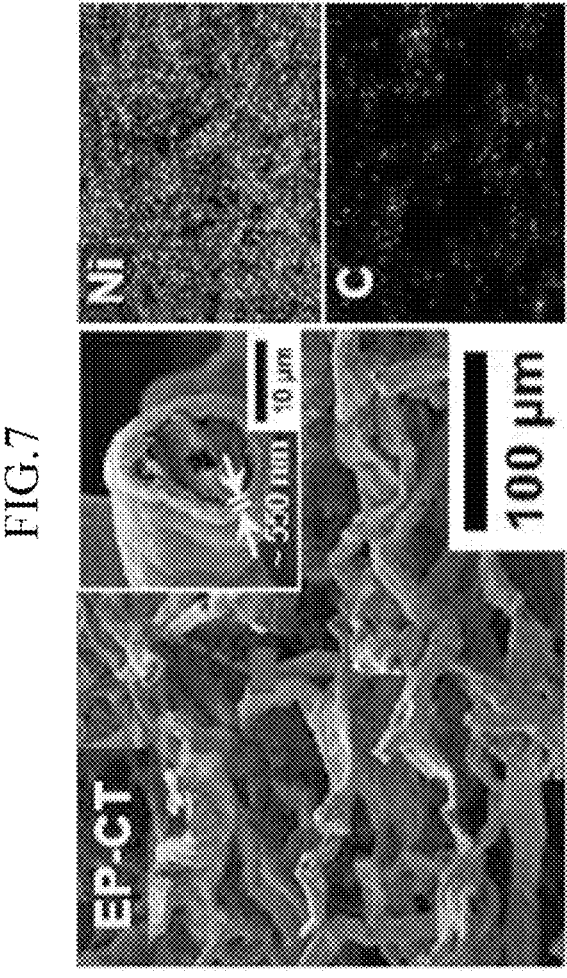
FIG. 7 shows SEM and elemental mapping images of an electroplated porous conductive structure according to the present invention.
Figure 8:
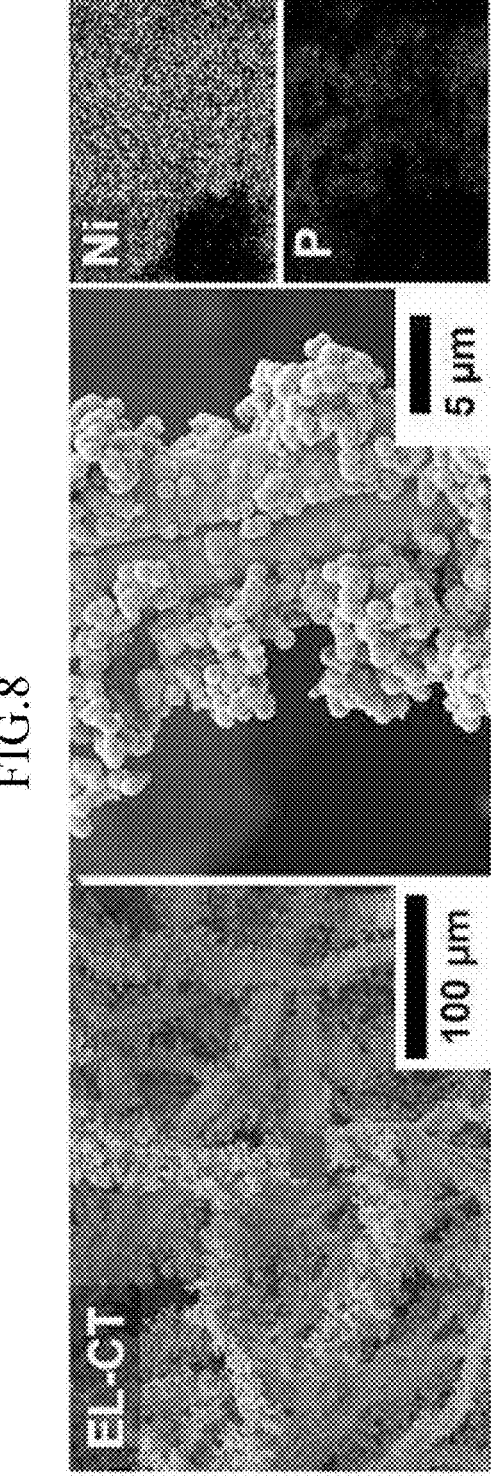
FIG. 8 shows SEM and elemental mapping images of a conductive structure manufactured by electroless plating of a textile material-based support.

FIGS. 7 and 8 show SEM and elemental mapping images of the conductive structure (EP-CT) according to the present invention and SEM and elemental mapping images of a conductive structure (EL-CT) manufactured by electroless plating of a textile material-based support without a carbonization process.

Referring to FIGS. 7 and 8, in the case of the present invention, it can be confirmed that a nickel distribution was uniform, and particularly, the surface of the applied metal material had a protruding structure in which nano-sized protrusions protruded and was uniformly coated. Meanwhile, when electroless plating was performed, it can be confirmed that the uniformity of the applied conductive material was significantly degraded, and problems such as agglomeration, pore clogging, and the like occurred.

Figure 10:
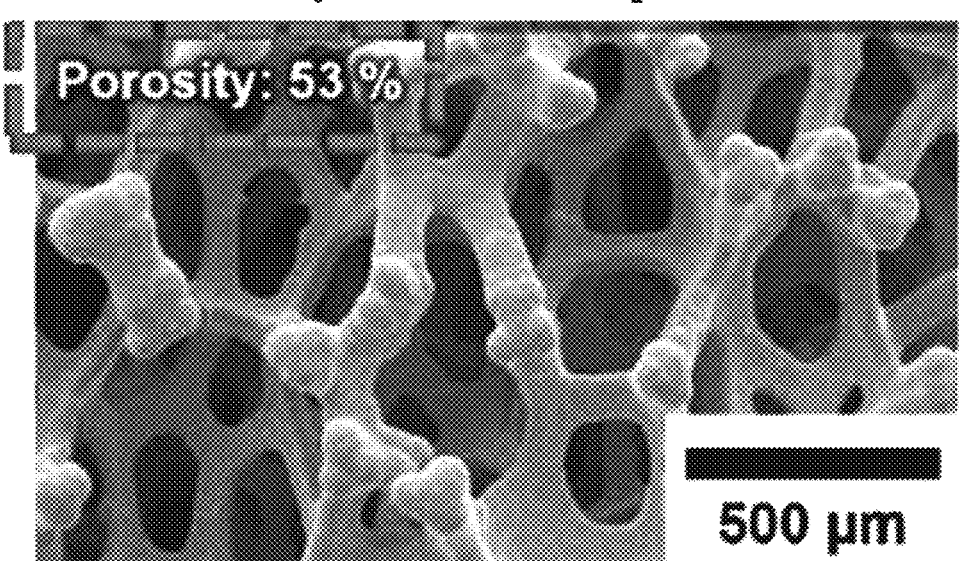
FIG. 10 shows an SEM image of a commercially available porous nickel support.

FIGS. 9 and 10 show an SEM image of the porous conductive structure (EP-CT) according to the present invention and an SEM image of a commercially available porous nickel support.

Referring to FIGS. 9 and 10, it can be confirmed that the porous conductive structure according to the present invention had significantly high porosity and a significantly large active area compared to a commercially available nickel support.

Figure 11:
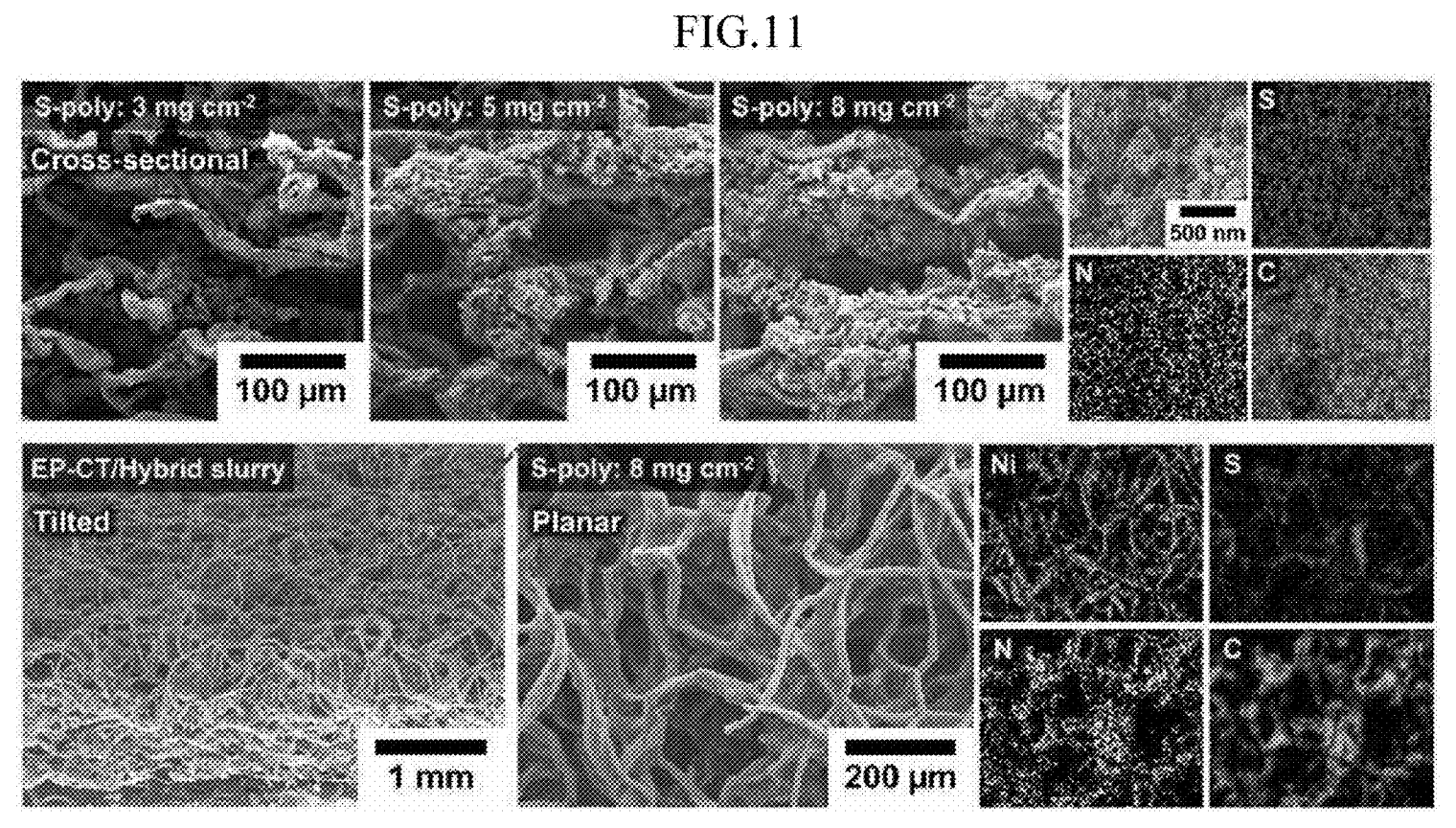

FIG. 11 shows a result when a sulfur polymer (S-poly) is loaded in the porous conductive structure (EP-CT) according to the present invention.

Referring to FIG. 11, in the case of the present invention, it can be confirmed that the sulfur polymer could be loaded in an amount of 3 mg to 8 mg/cm$^2$. In other words, it can be seen that, when EP-CT according to the example of the present invention is coated with a S-poly-containing mixed slurry (S-poly, NH$_2$-MWCNT, carbon black), a large amount (3, 5, and 8 mg/cm$^2$) of S-poly is loaded without clogging pores, and this result proves that the conductive structure manufactured according to the present invention can be loaded with a larger amount of active material while maintaining the initial porosity and network structure of the textile material.

FIG. 12 is a schematic diagram showing a method of manufacturing EP-CT/HS/CL by loading a carbon material modified with a second functional group and a carbon material modified with a first functional group in EP-CT/HS to form a capping layer and a diagram showing the bonding mechanism thereof.

Referring to FIG. 12, carbon nanotubes could be coupled layer by layer through hydrogen bonding between a first functional group and a second functional group. The capping layer formed by the bonding strength between the functional groups can improve the conductivity and performance stability of the EP-CT/HS electrode, and this suggests that, in the case of the electrode according to the present invention, a desired functional group can be stably introduced into an electrode support by the above-described method.

Figure 13:
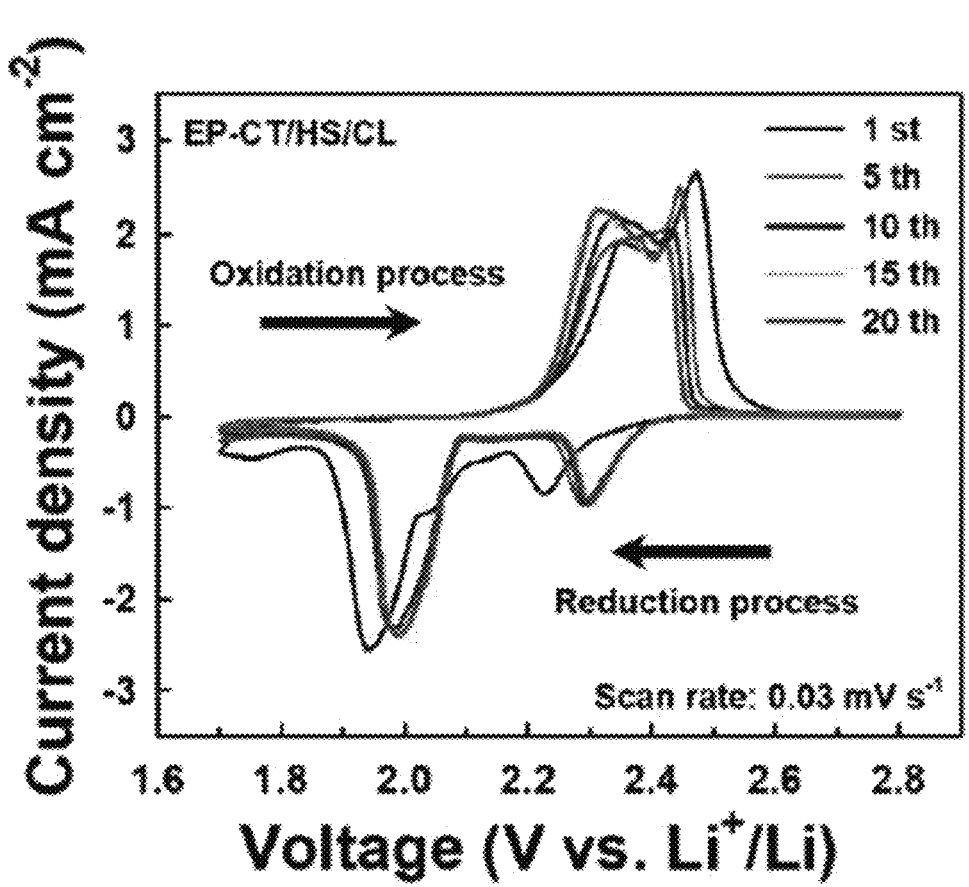
FIG. 13 shows a cyclic voltammetry (CV) measurement result of an EP-CT/HS/CL cathode (S-poly loading amount: 3 mg/cm²).

FIG. 13 shows a cyclic voltammetry (CV) measurement result of an EP-CT/HS/CL cathode (S-poly loading amount: 3 mg/cm$^2$) in which a capping layer is formed on EP-CT/HS.

Referring to FIG. 13, CV scanning was performed at a rate of 0.03 mVs$^{-1}$, and a voltage range was Li/Li+ vs 1.7 to 2.8 V. Looking at the result, the steady-state CV scanning result showed two reduction peaks at 2.28 V and 1.98 V, and these peaks result from (1) reduction of S-poly into a short oligosulfur unit and organosulfur-DIB of lithium polysulfide (Li$_2$S$_x$ 4≤x≤8) and (2) conversion of S-poly into a fully discharged organosulfur-DIB product and insoluble lithium sulfide (Li$_2$S$_2$ and Li$_2$S).

On the other hand, oxidation peaks were shown at 2.31 V and 2.42 V, and these peaks result from conversion of fully discharged short-chain organosulfur-DIB into long-chain S-poly.

Figure 14:
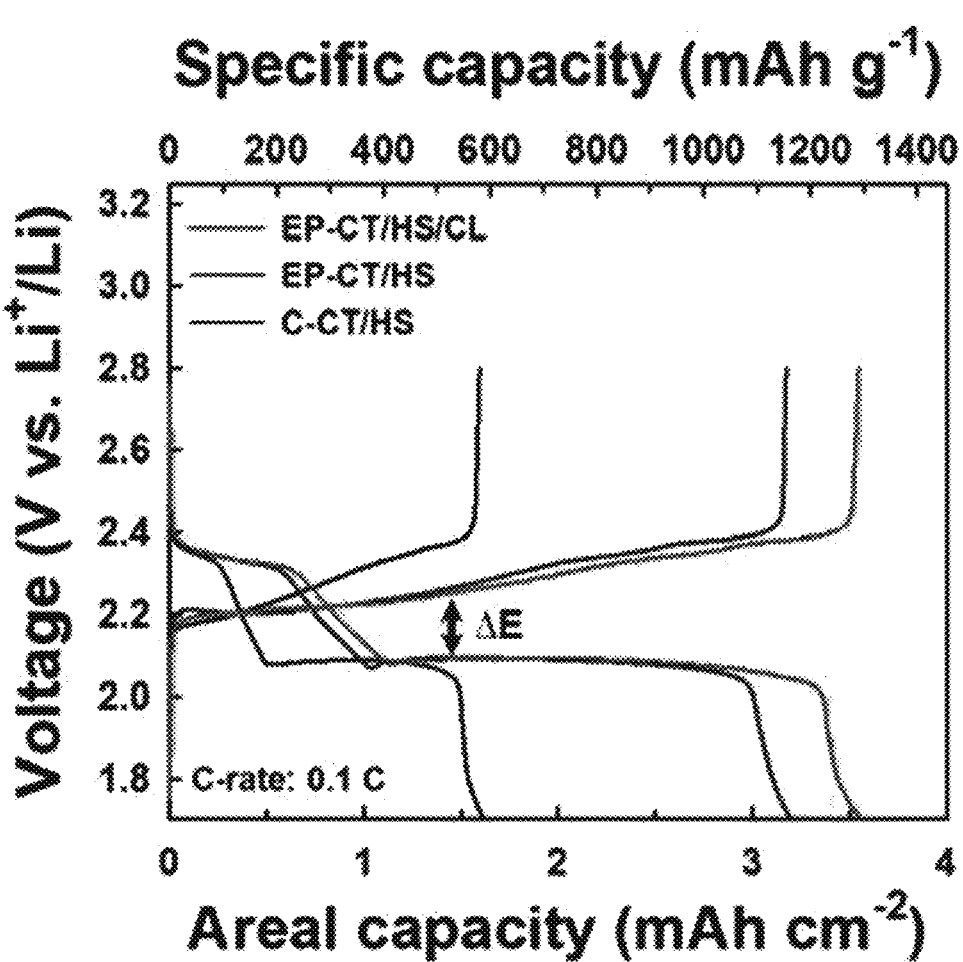
FIGS. 14 and 15 show the charge/discharge graph and rate characteristic comparison graph of C-CT/HS, EP-CT/HS, and EP-CT/HS/CL cathodes (S-poly loading amount: 3 mg/cm²)

FIG. 14 shows a measurement result of the galvanostatic charge/discharge (GCD) of an EP-CT/HS/CL cathode (S-poly loading amount: 3 mg/cm$^2$).

Referring to FIG. 14, C-CT/HS in which a sulfur slurry was loaded in a unelectroplated carbon support, EP-CT/HS not including a capping layer, and EP-CT/HS/CL including a capping layer formed therein exhibited two discharge plateaus, and this was consistent with the CV result of FIG. 13.

In other words, FIG. 14 shows that, when an S-poly amount is set to 3 mg/cm$^2$, EP-CT/HS (secondary discharge plateau: 1.9 mAh/cm$^2$ and ΔE: 165 mV) and EP-CT/HS/CL (2.1 mAh/cm$^2$ and 156 mV) exhibit long secondary discharge plateaus and small voltage gaps (LIE) compared to C-CT/HS (1 mAh/cm$^2$ and 210 mV). This means that the porous conductive structure (EP-CT) according to the present invention has high electrode reaction efficiency and an excellent interfacial reaction with an active material compared to a carbonized support (C-CT).

Figure 15:
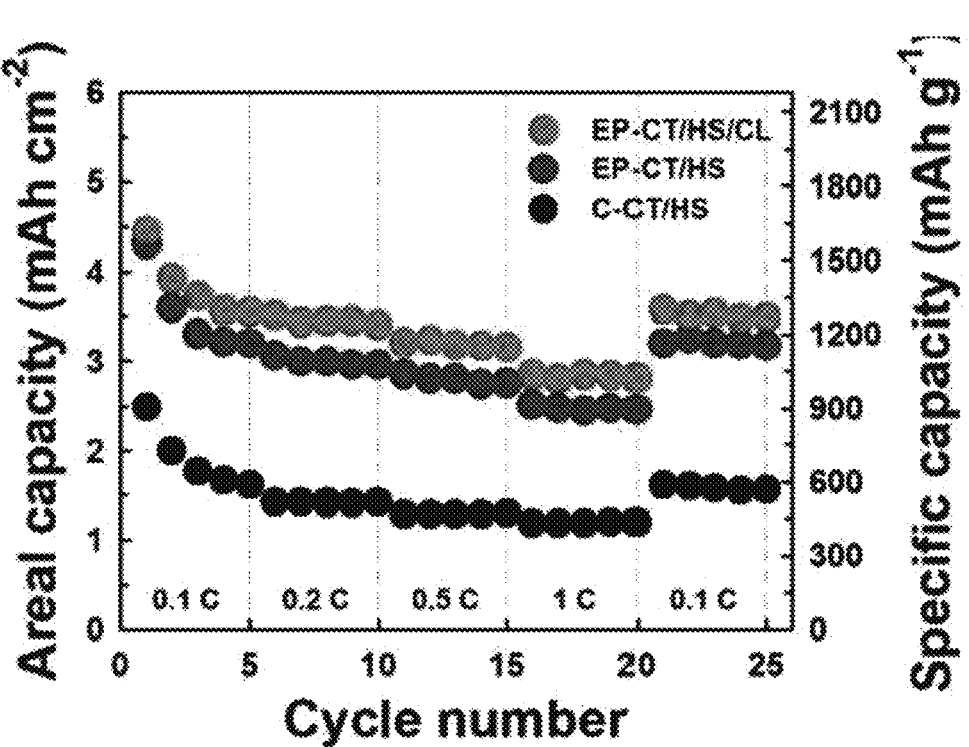

FIG. 15 shows a comparison graph of the rate characteristics of a lithium-sulfur battery (loading amount: 3 mg/cm$^2$), and FIG. 16 shows a comparison table of capacity characteristics.

Referring to FIGS. 15 and 16, it can be confirmed that, when the porous conductive structure (EP-CT) according to the present invention was used as an electrode and a capping layer was introduced by a layer-by-layer self-assembly method, a rapid interfacial reaction, excellent rate characteristics, and high capacity were exhibited. In other words, it can be seen that, when the amount of loaded S-poly, which is an active material, is 3 mg/cm$^2$, the performance value of EP-CT/HS (the present invention) not including a capping layer is higher than that of C-CT/HS (comparative example). This shows that EP-CT has higher performance than C-CT by enabling a rapid oxidation-reduction reaction of sulfur during charging and discharging. Also, FIG. 15 shows that, as the C-rate is increased, the performance value of EP-CT is higher than that of C-CT, and thus rapid charging and discharging is possible. The quantitative difference thereof can be seen from FIG. 16. Particularly, it can be seen that charge/discharge characteristics are improved by forming a capping layer.

Figure 17:
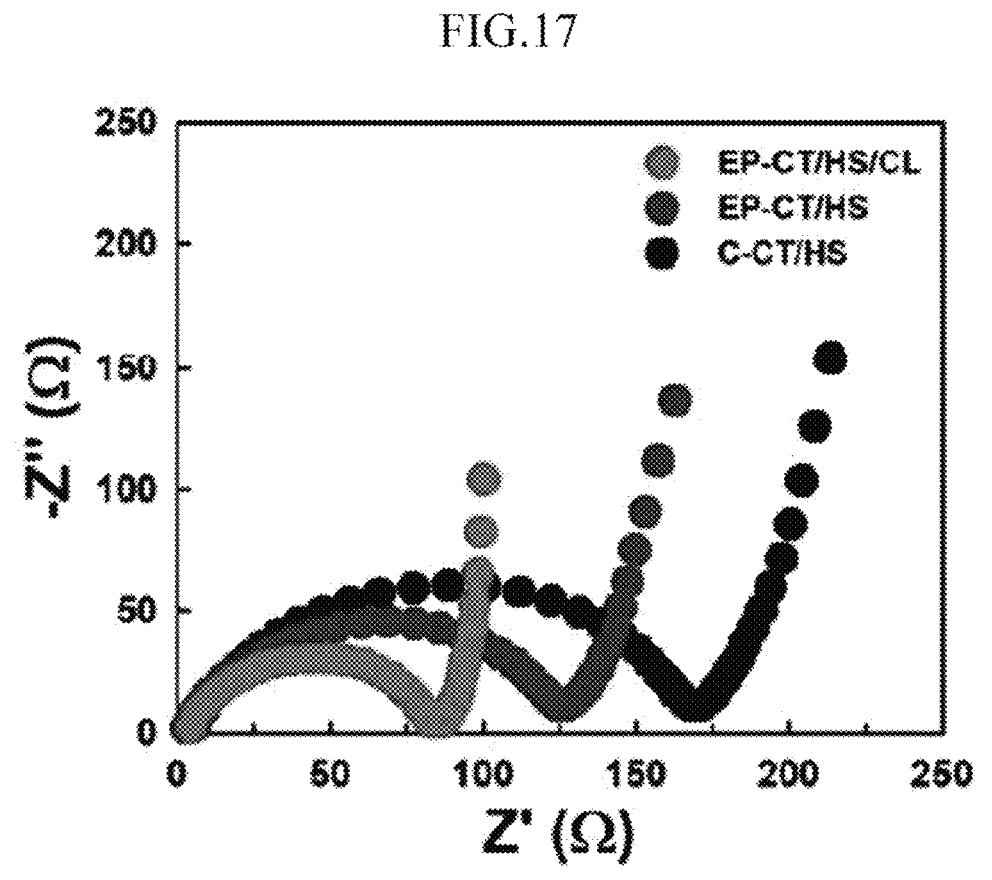

FIG. 17 shows a Nyquist plot analysis result of electrodes.

Referring to FIG. 17, the EP-CT/HS cathode according to the present invention exhibited a low charge transfer resistance (Rct) value compared to C-CT/HS, and this suggests that the charge transfer characteristics of EP-CT (123Ω) is higher than that of C-CT (164Ω). Also, the EP-CT/HS/CL cathode including a capping layer formed therein exhibited a relatively low Rct value (81Ω), and it can be seen from the result that the cathode for a lithium-sulfur battery according to the present invention exhibits high redox kinetic characteristics by introducing a conductive capping layer into the EP-CT structure.

Figure 18:
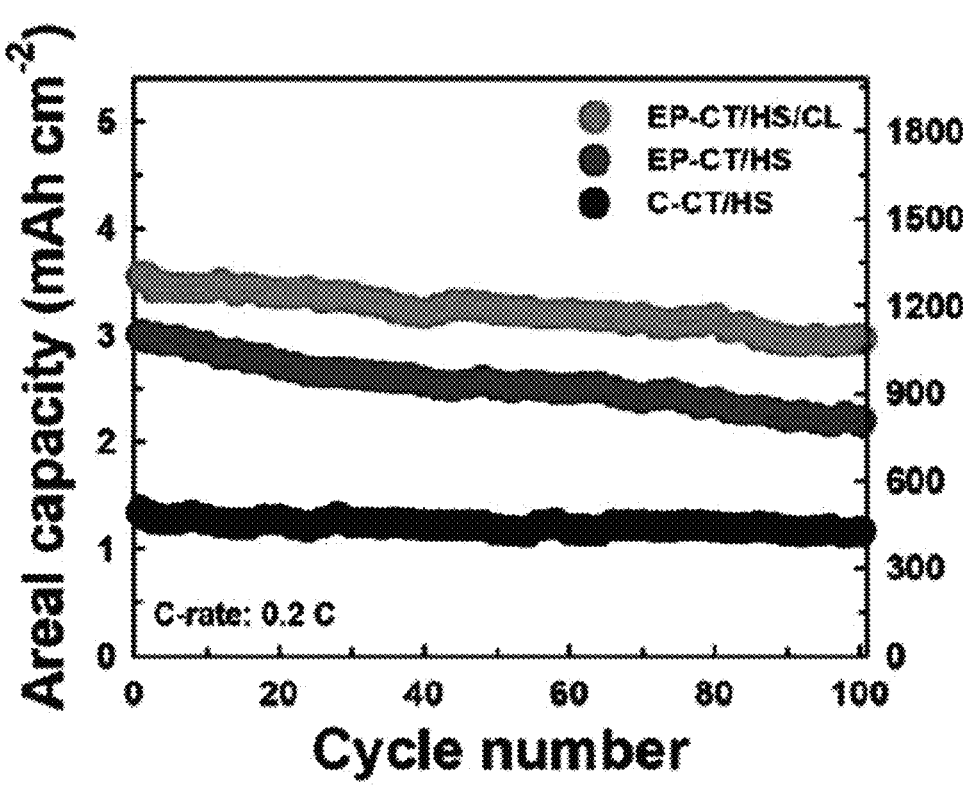
FIG. 18 shows a cycling test result of C-CT/HS, EP-CT/HS, and EP-CT/HS/CL cathodes (S-poly loading amount: 3 mg/cm²).

FIG. 18 shows a cycling test result showing that the electrode according to the present invention has very high cycling safety.

Referring to FIG. 18, it can be confirmed that the electrode in which a conductive capping layer was formed according to the present invention had high safety and maintained high areal capacity.

Figure 19A:
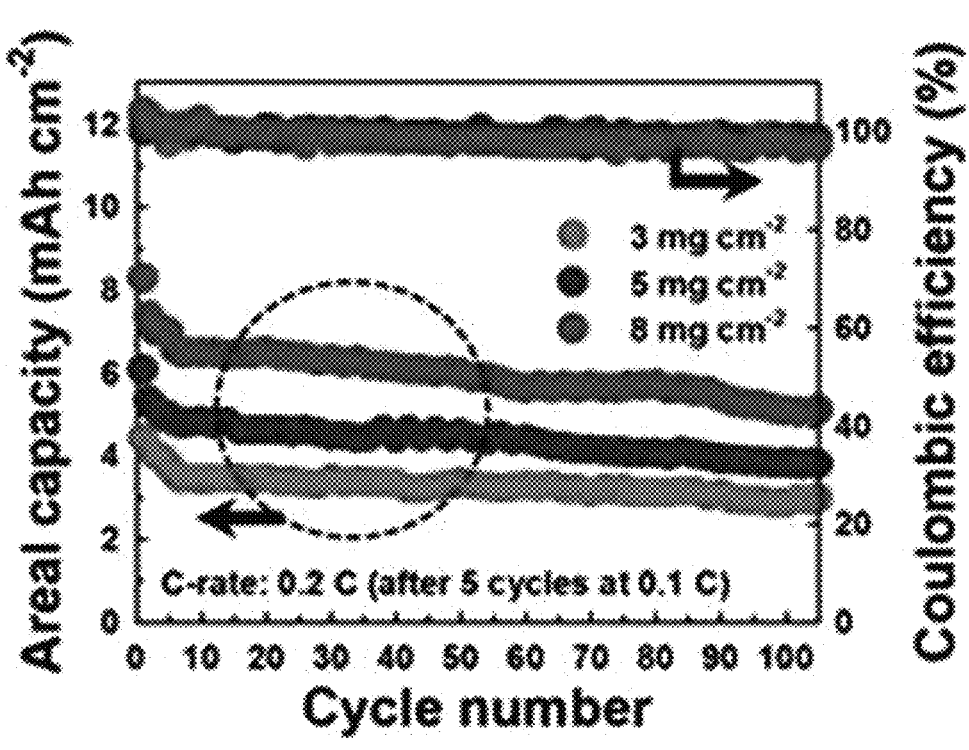
FIG. 19 shows graphs of analyzing the capacity per unit area/mass and performance stability of an EP-CT/HS/CL cathode when an S-poly loading amount is increased to 3, 5, and 8 mg/cm².
Figure 19B:
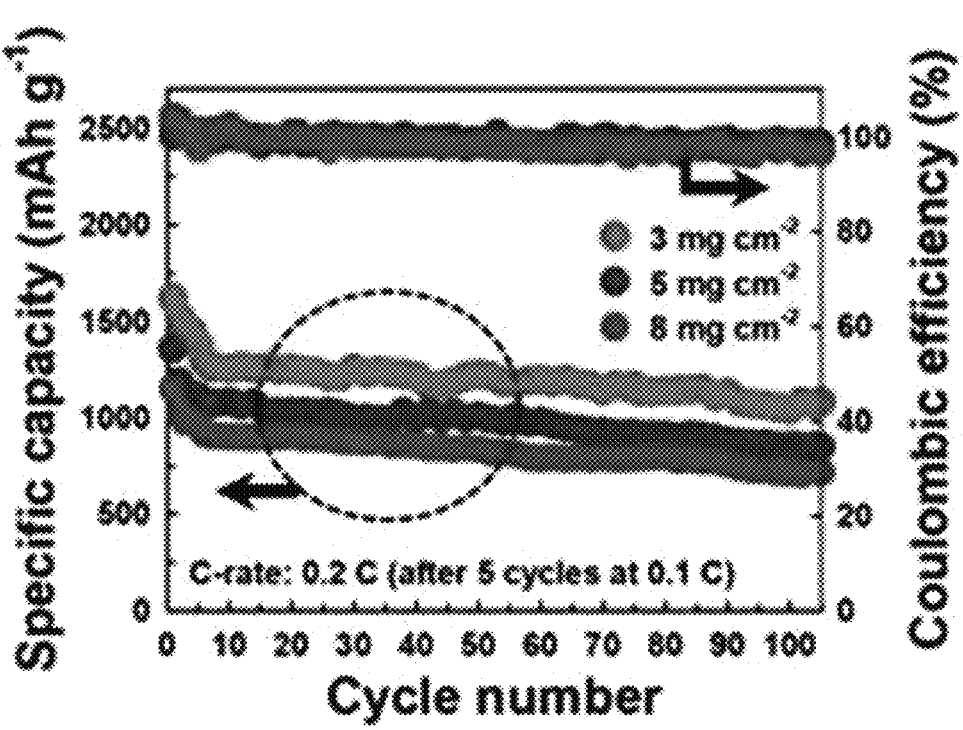

FIG. 19 shows graphs of analyzing the performance of the cathode for a lithium-sulfur battery when loading amounts are 3, 5, and 8 mg/cm².

Referring to FIG. 19, it can be confirmed that, when the conductive structure according to the present invention was used as an electrode, high energy capacity per area/mass could be achieved.

From FIG. 19, it can be seen that, as the amount of loaded S-poly is increased to 8 mg/cm², performance per area and performance per mass are better, and this result eventually proves that the charge transfer characteristics of EP-CT, which is a metal, are excellent, a large loading amount is implemented due to a porous structure, and accordingly, excellent performance per area is exhibited.

In other words, the electrode structure according to the present invention can be applied to an energy storage element and also allow a biological active material (e.g., an enzyme material or a probe) to be immobilized based on the conductivity and high loading amount of the electrode structure, and in this case, a large amount of a liquid sample can be absorbed into and come in contact with the porous support. Therefore, the present invention can develop a sensor electrode that exhibits high sensitivity even with a small amount of sample compared to a biosensor using a substrate structure such as glass.

Furthermore, in the present invention, the performance efficiency and stability of a cathode are improved using a separate capping layer, and this suggests that any functional group capable of bonding to a sensor probe material can be introduced into a conductive support having metallic properties.

The above-described conductive structure according to the present invention can be applicable to not only an electrode of an energy storage element but also a conductive material (e.g., a catalyst, a sensor, etc.) that requires a large specific surface area and high porosity, all of which fall within the scope of the present invention.

INDUSTRIAL APPLICABILITY

The present invention relates to an electrode material and has industrial applicability.

The invention claimed is:

1. A method of manufacturing a cathode for a lithium-sulfur battery using a textile material, the method comprising:

carbonizing a textile material through thermal treatment to prepare a conductive support;

subjecting the conductive support to electroplating with a conductive metal material;

loading, in the coated conductive support, a slurry including a sulfur polymer and a first carbon material modified with a first functional group capable of hydrogen bonding with the sulfur polymer; and loading, in the resulting conductive support, a second carbon material modified with a second functional group capable of layer-by-layer self-assembly with the first carbon material to form a capping layer.

2. The method of claim 1, wherein the carbon material is a carbon nanotube, the first functional group is an amine group, and the second functional group is a carboxyl group.

3. The method of claim 1, wherein the thermal treatment is performed at 600° C. to 2000° C., and the carbon support prepared by the thermal treatment maintains a network structure of the textile material as it is.

4. The method of claim 1, wherein the conductive material includes at least one selected from the group consisting of Ni, Cu, and Al.

5. The method of claim 1, wherein the textile material is a textile containing carbon atoms in a main chain.

6. A cathode for a lithium-sulfur battery, comprising:

a carbon support having a network structure of a textile material;

a conductive metal material applied on the carbon support;

a sulfur polymer loaded in the conductive metal material;

a first carbon material modified with a first functional group which is bonded to the sulfur polymer; and a second carbon material which is bonded to the first carbon material to form a capping layer.

7. The cathode of claim 6, wherein the cathode for a lithium-sulfur battery is manufactured by a method comprising:

carbonizing a textile material through thermal treatment to prepare a conductive support;

subjecting the conductive support to electroplating with a conductive metal material;

loading, in the coated conductive support, a slurry including a sulfur polymer and a first carbon material modified with a first functional group capable of hydrogen bonding with the sulfur polymer; and loading, in the resulting conductive support, a second carbon material modified with a second functional group capable of layer-by-layer self-assembly with the first carbon material to form a capping layer.

8. The cathode of claim 6, wherein the carbon material is a carbon nanotube, the first functional group is an amine group, and the second functional group is a carboxyl group.

9. The cathode of claim 6, wherein the conductive material includes at least one selected from the group consisting of Ni, Cu, and Al.

10. A lithium-sulfur battery comprising the cathode for a lithium-sulfur battery according to claim 6.

\* \* \* \* \*